United States Patent
Yanagisawa et al.

(10) Patent No.: US 6,841,610 B2
(45) Date of Patent: Jan. 11, 2005

(54) FLUORINATED CARBON FIBER, AND ACTIVE MATERIAL FOR BATTERY AND SOLID LUBRICANT USING THE SAME

(75) Inventors: Takashi Yanagisawa, Tokyo (JP); Morinobu Endo, Suzaka (JP)

(73) Assignees: GSI Creos Corporation, Tokyo (JP); Morinobu Endo, Suzaka (JP)

( * ) Notice: Subject to any disclaimer, the term of this patent is extended or adjusted under 35 U.S.C. 154(b) by 304 days.

(21) Appl. No.: 10/098,570

(22) Filed: Mar. 18, 2002

(65) Prior Publication Data

US 2002/0137836 A1 Sep. 26, 2002

(30) Foreign Application Priority Data

Mar. 21, 2001 (JP) ........................................ 2001-081742
Aug. 29, 2001 (JP) ........................................ 2001-260418

(51) Int. Cl.[7] .............................. C08J 3/00; C08K 3/04; C08L 63/00; D01F 9/12; D01C 5/00
(52) U.S. Cl. ................. 524/495; 423/447.1; 423/447.2; 423/447.3; 423/450; 423/453; 423/445 B; 523/134
(58) Field of Search ...................... 524/495; 423/447.1, 423/447.2, 447.3, 450, 453, 445 B; 523/134

(56) References Cited

U.S. PATENT DOCUMENTS

| | | | | |
|---|---|---|---|---|
| 4,855,091 A | * | 8/1989 | Geus et al. ................. | 264/437 |
| 5,106,606 A | * | 4/1992 | Endo et al. ............... | 423/447.2 |
| 5,780,101 A | | 7/1998 | Nolan et al. | |
| 6,654,229 B2 | | 11/2003 | Yanagisawa et al. | |
| 2002/0136682 A1 | | 9/2002 | Yanagisawa et al. | |
| 2002/0136881 A1 | | 9/2002 | Yanagisawa et al. | |
| 2002/0136882 A1 | | 9/2002 | Yanagisawa et al. | |
| 2002/0182505 A1 | | 12/2002 | Yanagisawa et al. | |
| 2003/0026982 A1 | | 2/2003 | Yanagisawa et al. | |
| 2003/0044602 A1 | | 3/2003 | Yanagisawa et al. | |
| 2003/0044615 A1 | | 3/2003 | Yanagisawa et al. | |
| 2003/0044685 A1 | | 3/2003 | Yanagisawa et al. | |

FOREIGN PATENT DOCUMENTS

| | | |
|---|---|---|
| EP | 0 198 558 A2 | 10/1986 |
| EP | 0 421 306 A2 | 4/1991 |
| EP | 1 122 344 A2 | 8/2001 |

OTHER PUBLICATIONS

U.S. patent application Ser. No. 10/098,103, Yanagisawa et al., filed Mar. 18, 2002.

Endo et al., "Structural characterization of cup–stackedtype nanofibers with an entirely hollow core", Applied Physics Letters, vol. 80, No. 7, Feb. 18, 2002, pp. 1267–1269.

Kim et al., "Effect of ball milling on morphology of cup-stacked carbon nanotubes", Chemical Physics Letters, Mar. 2002.

Endo et al., "Structural characterization of cup–stacked nanofibers with an entirely hollow core," Applied Physics Letters, vol. 80, No. 7, Feb. 18, 2002, pp. 1267–1269. (Filed with IDS submitted on Jul. 8, 2002).

Terrones et al., "Graphitic cores in palladium catalysed carbon nanofibres," Chemical Physics Letters, vol. 343, Aug. 3, 2001, pp. 241–250.

Endo et al., "Pyrolytic Carbon Nanotubes from VaporGrown Carbon Fibers," Carbon, Elsevier Science Publishing, New York, NY, vol. 33, No. 7, 1995, pp. 873–881.

* cited by examiner

*Primary Examiner*—Patrick D. Niland
(74) *Attorney, Agent, or Firm*—Oliff & Berridge PLC

(57) ABSTRACT

A fluorinated carbon fiber has a hollow core structure in which a number of hexagonal carbon layers in the shape of a cup having no bottom are stacked. Edges of the hexagonal carbon layers are exposed on the inner and outer surfaces of the fluorinated carbon fiber. In the fluorinated carbon fiber, the exposed edges of the hexagonal carbon layers are fluorinated and have a structure shown by $C_xF_y$.

8 Claims, 12 Drawing Sheets

FLUORINATED CARBON FIBER, AND ACTIVE MATERIAL FOR BATTERY AND SOLID LUBRICANT USING THE SAME

Japanese Patent Application No. 2001-81742 filed on Mar. 21, 2001 and Japanese Patent Application No. 2001-260418 filed on Aug. 29, 2001 are hereby incorporated by reference in their entirety.

BACKGROUND OF THE INVENTION

The present invention relates to a fluorinated carbon fiber, and an active material for battery and a solid lubricant using the same.

A vapor-grown carbon fiber is known in the art.

This carbon fiber is a short fiber in which carbon obtained by pyrolysis of hydrocarbons such as benzene or methane at a temperature of about 700° C. to 1000° C. is grown with a catalyst particle such as a ultra-fine iron particle or nickel as a nucleus.

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at an specific angle.

A thin deposited layer in which an excess amount of insufficiently crystallized amorphous carbon is deposited is inevitably formed on the surface of carbon fibers manufactured by a vapor growth process. Such carbon fibers generally have low degree of surface activity due to the presence of this deposited layer.

In addition, application fields of vapor grown carbon fibers having a herring-bone structure have hardly been developed.

BRIEF SUMMARY OF THE INVENTION

The present invention has enabled fluorination of a carbon fiber having a herring-bone structure by activating the surface of the carbon fiber. The present invention may provide a fluorinated carbon fiber, and an active material for battery and a solid lubricant using the same.

In order to solve the above problems, one aspect of the present invention provides a fluorinated carbon fiber comprising a coaxial stacking morphology of truncated conical tubular graphene layers or a truncated graphene conical tubule's morphology, and each of the truncated conical tubular graphene layers includes a hexagonal carbon layer.

In other words, this fluorinated carbon fiber has a cup-stacked structure or lampshade-stacked structure in which a number of hexagonal carbon layers in the shape of a cup having no bottom are stacked. The coaxial stacking morphology of the truncated conical tubular graphene layers may have a shape of a hollow core with no bridge. In this structure, each of the truncated conical tubular graphene layers has a large ring end at one end and a small ring end at the other end in an axial direction, and edges of the hexagonal carbon layers are exposed at the large ring ends on an outer surface and the small ring ends on an inner surface. In other words, the edges of the tilted hexagonal carbon layers of the herring-bone structure are exposed in layers.

In an ordinary carbon fiber with a herring-bone structure, a number of hexagonal carbon layers in the shape of a cup having a bottom are stacked. However, the fluorinated carbon fiber according to this aspect of the present invention has a hollow structure with no bridge and has a length ranging from several tens of nanometers to several tens of microns.

If the coaxial stacking morphology of the truncated conical tubular graphene layers is vapor grown, a wide area of the outer surface or the inner surface may be covered with deposited films of an excess amount of pyrolytic carbon. In this aspect, at least part of edges of the hexagonal carbon layers may be exposed at the large ring ends on the outer surface or at the small ring ends on the inner surface.

In the fluorinated carbon fiber according to this aspect of the present invention, the exposed edges of the hexagonal carbon layers are fluorinated and have a structure shown by $C_xF_y$.

According to this aspect of the present invention, part or all of the deposited films formed over the outer surface or the inner surface during the vapor growth process of the carbon fiber may be removed by a treatment to be performed later. Since these deposited layers are formed of an excess amount of insufficiently crystallized amorphous carbon, the surfaces of these deposited layers are inactive.

In the fluorinated carbon fiber according to this aspect of the present invention, an outer surface of the fluorinated carbon fiber may be formed of the large ring ends stacked in the axial direction. In this case, exposed part of the edges of the hexagonal carbon layers may have an area equal to or more than 2 percentages of an area of the outer surface, and preferably 7 percentages of the area of the outer surface.

An inner surface of the fluorinated carbon fiber may be formed of the small ring ends stacked in the axial direction, and the edges of the hexagonal carbon layers may be exposed on the inner surface.

The edges of the hexagonal carbon layers exposed on the inner and outer surfaces of the carbon fiber can be fluorinated in this manner.

The fluorinated carbon fiber is suitably used for applications such as an active material for a battery including a lithium-ion battery, and a solid lubricant.

DETAILED DESCRIPTION OF THE EMBODIMENT

One embodiment of the present invention is described below in detail with reference to the drawings.

A vapor grown carbon fiber is a short fiber in which carbon obtained by pyrolysis of hydrocarbons such as benzene or methane data temperature of about 700° C. to 1000° C. is grown with a catalyst particle such as an ultra-fine iron particle or nickel as a nucleus.

Carbon fibers generally have a structure in which the hexagonal carbon layers are grown concentrically or a structure in which the hexagonal carbon layers are grown in an axial direction of the fiber. However, depending upon the vapor growth conditions such as catalyst, temperature range, and flow rate, carbon fibers may have a herring-bone structure in which the stacked hexagonal carbon layers are tilted with respect to the fiber axis at a specific angle.

Carbon fibers with a herring-bone structure generally have a structure in which a number of hexagonal carbon layers in the shape of a cup having a bottom are stacked. However, the vapor-grown carbon fiber according to one embodiment of the present invention has a structure in which a number of hexagonal carbon layers in the shape of a cup having no bottom are stacked (this bottomless carbon fiber is hereinafter called "carbon fiber having a herring-bone structure").

Figures 11, 12:
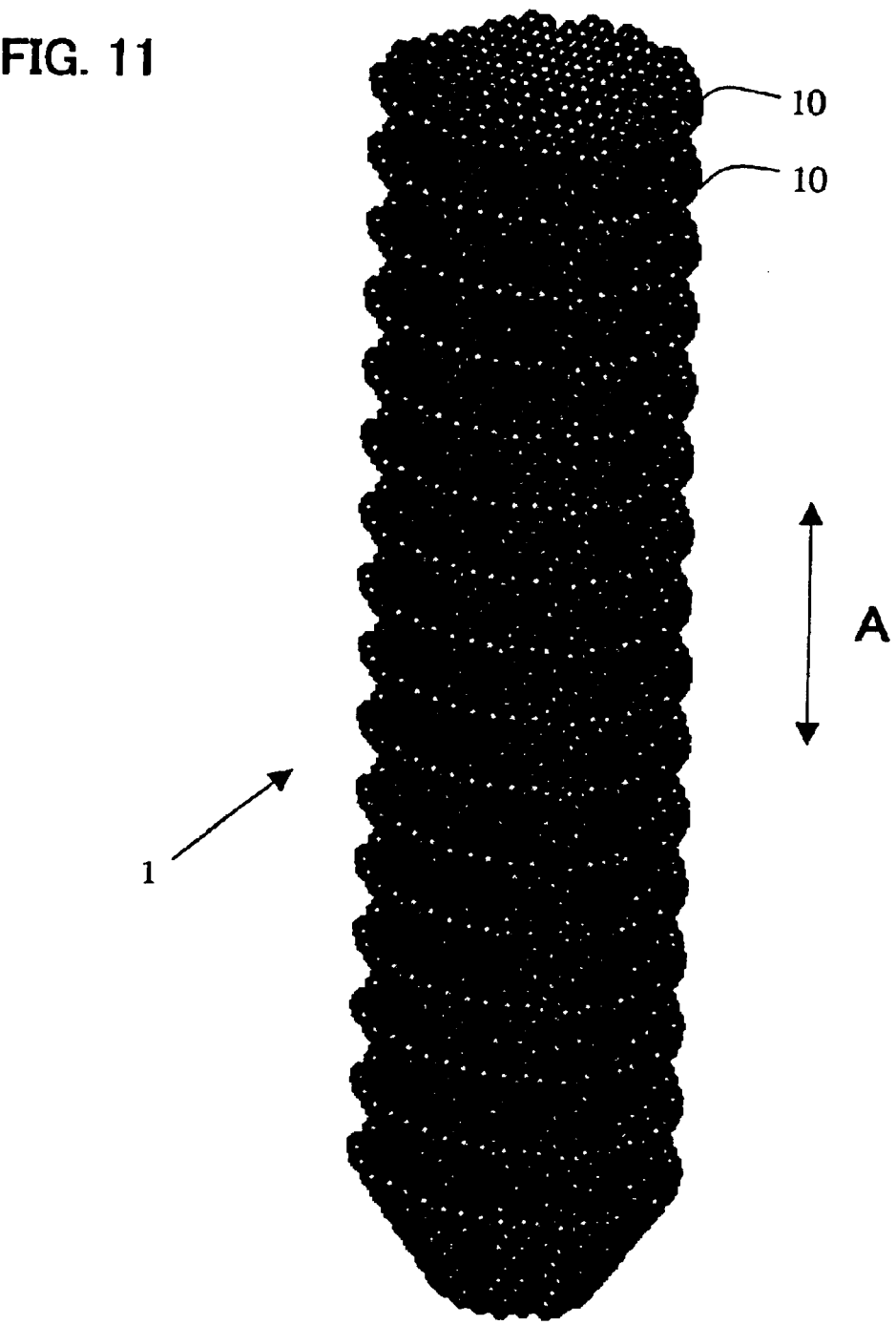
FIG. 11 is a computer graphic showing a coaxial stacking morphology of truncated conical tubular graphene layers based on rigorous quantum theoretical calculation.
FIG. 12 is a computer graphic showing a hexagonal carbon layer, which is a unit of the coaxial stacking morphology of the truncated conical tubular graphene layers shown in FIG. 11, based on rigorous quantum theoretical calculation.

Specifically, this carbon fiber 1 has a coaxial stacking morphology of truncated conical tubular graphene layers shown by a computer graphic in FIG. 11. Each of the truncated conical tubular graphene layers is formed of a hexagonal carbon layer 10 shown in FIG. 12. Although the actual hexagonal carbon layers 10 shown in FIG. 11 are stacked densely in an axial direction A, they are stacked roughly in FIG. 11 for convenience of description.

Figure 13:
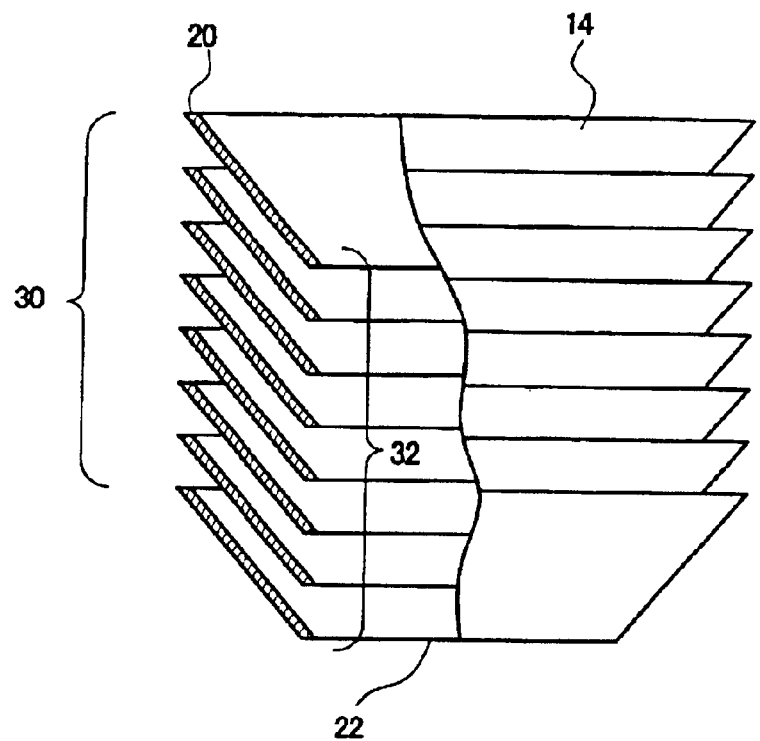
FIG. 13 is a schematic view of a large ring end and a small ring end which respectively form an outer surface and an inner surface of the coaxial stacking morphology of truncated conical tubular graphene layers.

FIG. 13 is a schematic view of FIG. 11. Each of the hexagonal carbon layers 10 has a large ring end 20 at one end and a small ring end 22 at the other end in the axial direction. An outer surface 30 of the carbon fiber 1 is formed of the large ring ends 20 stacked in the axial direction A. An inner surface 32 of the carbon fiber 1 is formed of the small ring ends 22 stacked in the axial direction A. The carbon fiber 1 is thus in the shape of a hollow core with no bridge and has a center hole 14.

An example of a method of manufacturing the carbon fiber 1 shown in FIG. 11 is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3 \times 10^{-7}$ mol/s. The reaction temperature and the reaction time were about 1100° C. and about 20 minutes, respectively. As a result, a carbon fiber having a herring-bone structure with an average diameter of about 100 nenometers was obtained. A hollow carbon fiber having no bridge at a length ranging from several tens of nanometers to several tens of microns, in which a number of hexagonal carbon layers in the shape of a cup having no bottom are stacked, is obtained by adjusting the flow rate of the raw material and the reaction temperature (which are changed depending on the size of the reactor).

Figure 1:
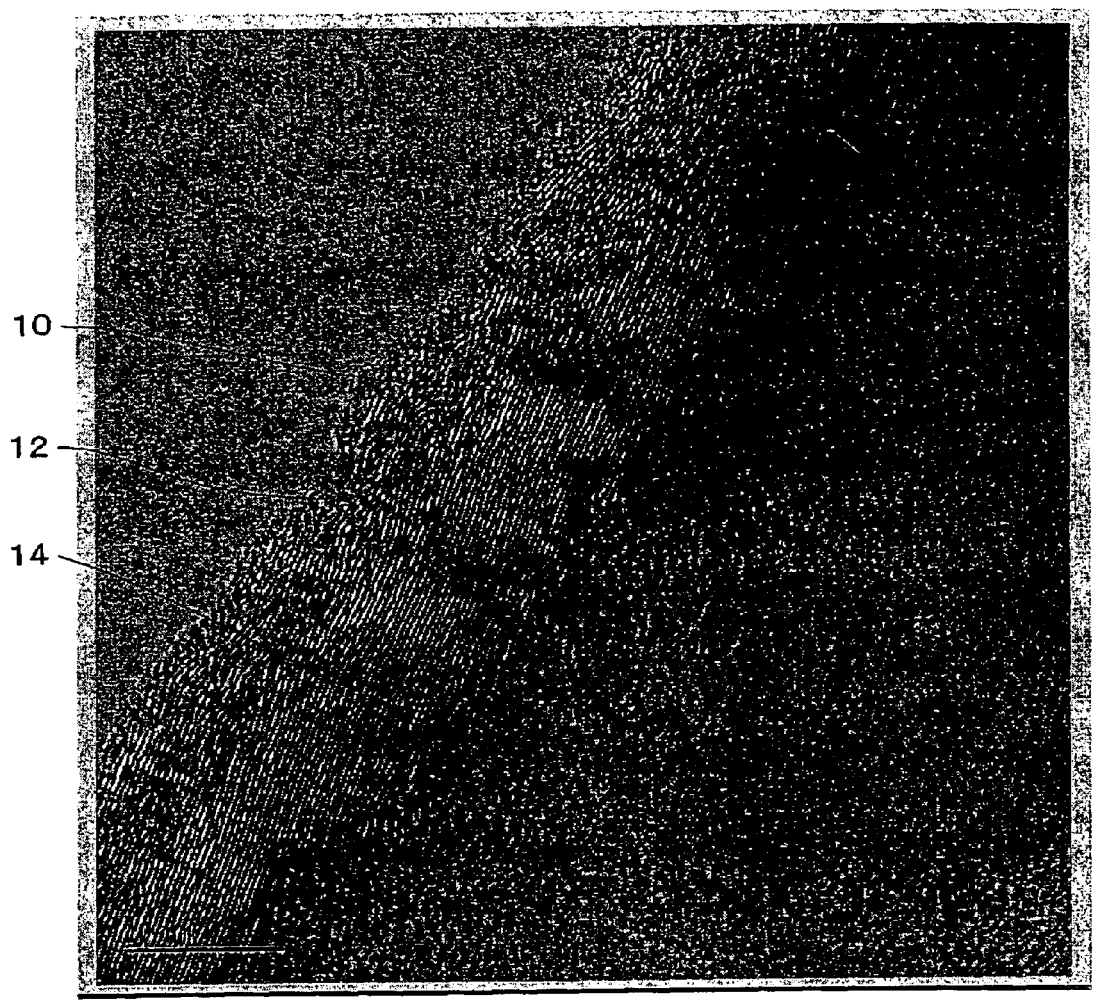
FIG. 1 is a copy of a transmission electron micrograph showing a carbon fiber having a herring-bone structure manufactured by a vapor growth process.
Figure 2:
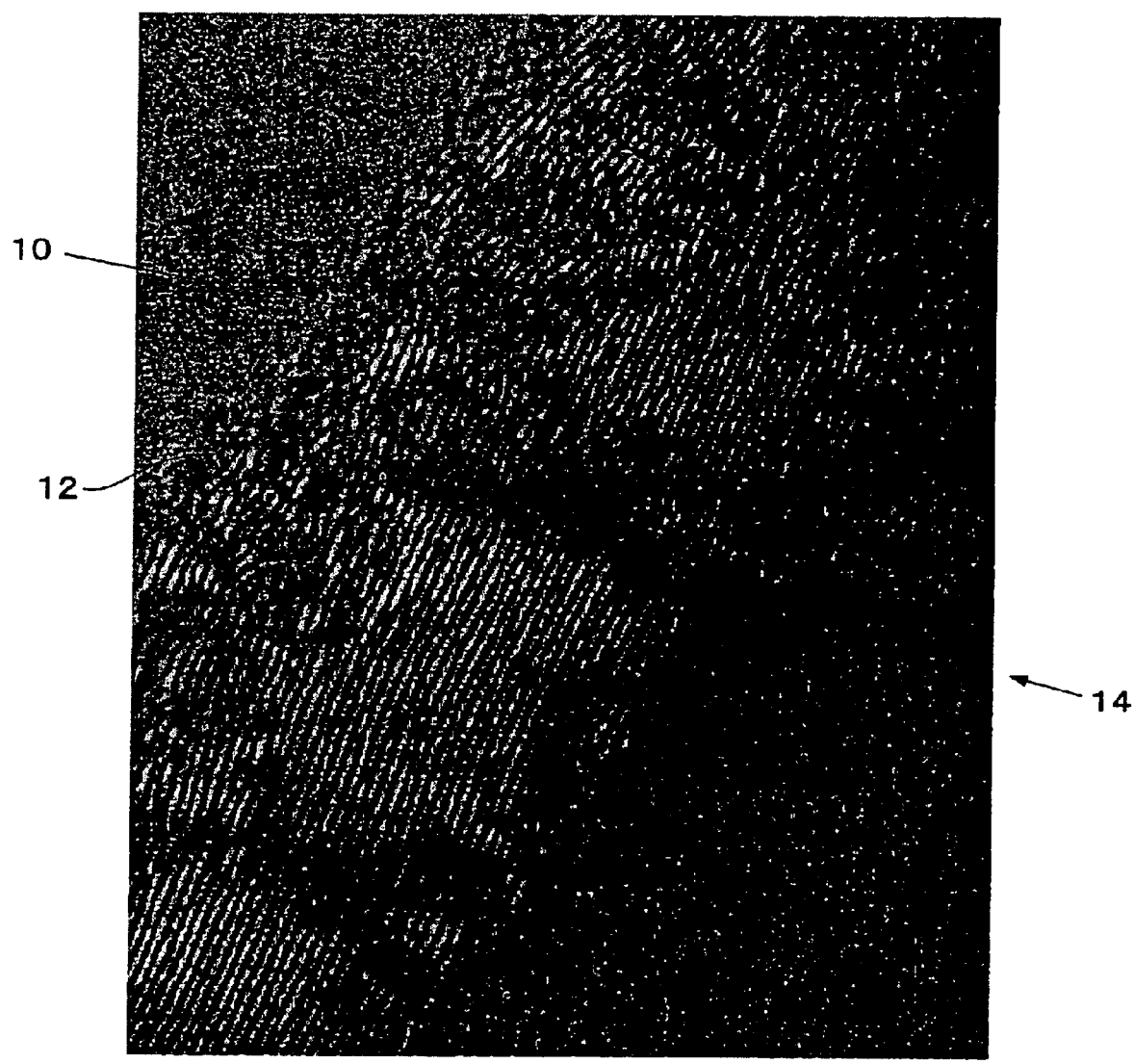
FIG. 2 is a copy of an enlarged micrograph of FIG. 1.
Figure 3:
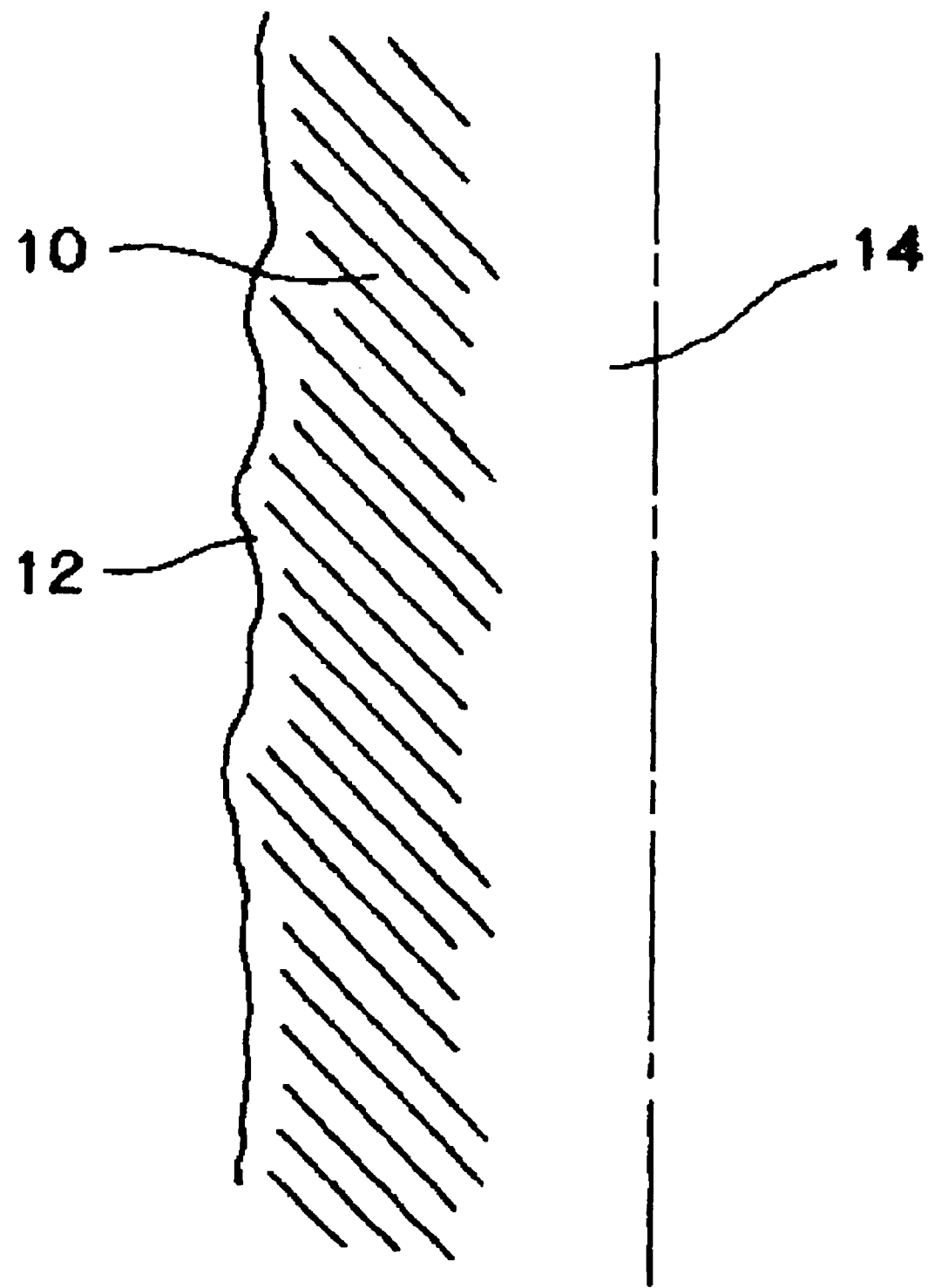
FIG. 3 is a schematic view of FIG. 2.

FIG. 1 is a copy of a transmission electron micrograph showing the carbon fiber having a herring-bone structure manufactured by the vapor growth process. FIG. 2 is a copy of an enlarged micrograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. The thickness of the deposited layer 12 is about several nanometers. A reference numeral 14 indicates the center hole.

Figure 14:
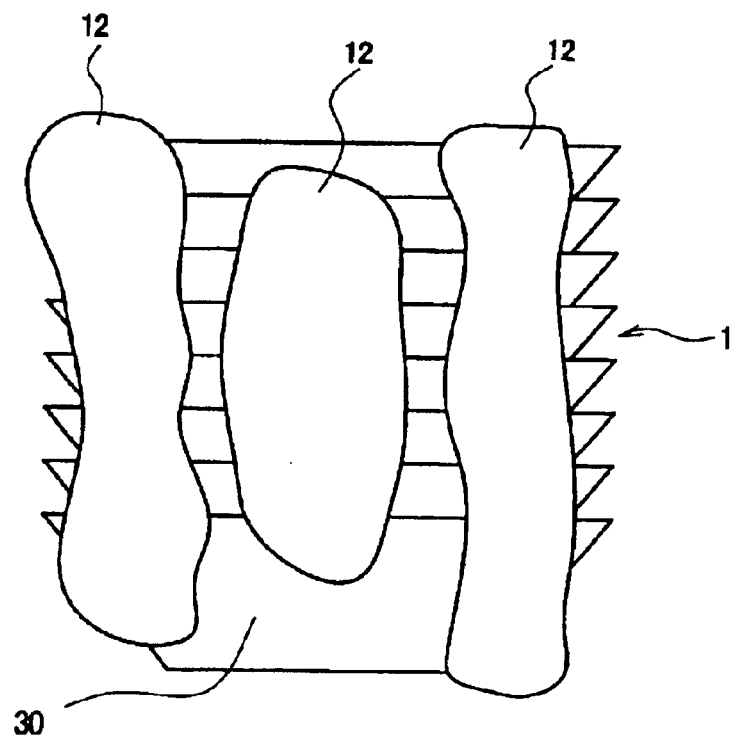
FIG. 14 is a schematic view of a deposited film of pyrolytic carbon formed over a wide range of an outer surface of a carbon fiber.

FIG. 14 is a schematic view showing a state in which the deposited films 12 are formed over a wide area of the outer surface 30 of the carbon fiber 1. As shown in FIG. 14, the hexagonal carbon layers 10 are exposed on the large ring ends 20 in the areas in which the outer surface of the carbon fiber 1 is not covered with the deposited films 12. These areas have a high activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520° C. to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
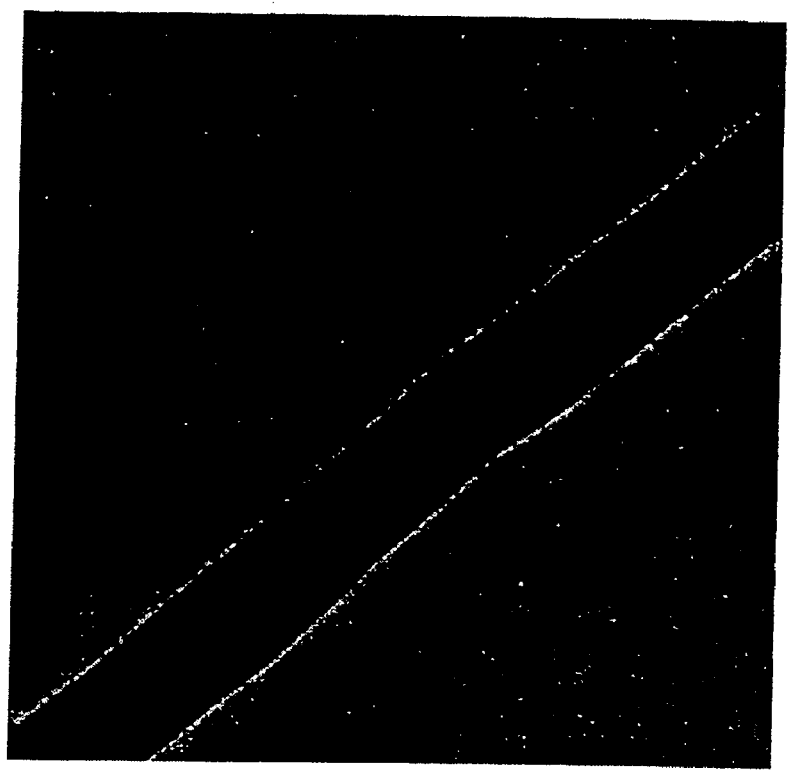
FIG. 4 is a copy of a transmission electron micrograph showing a carbon fiber having a herring-bone structure heated at a temperature of about 530° C. for one hour in air.
Figure 5:
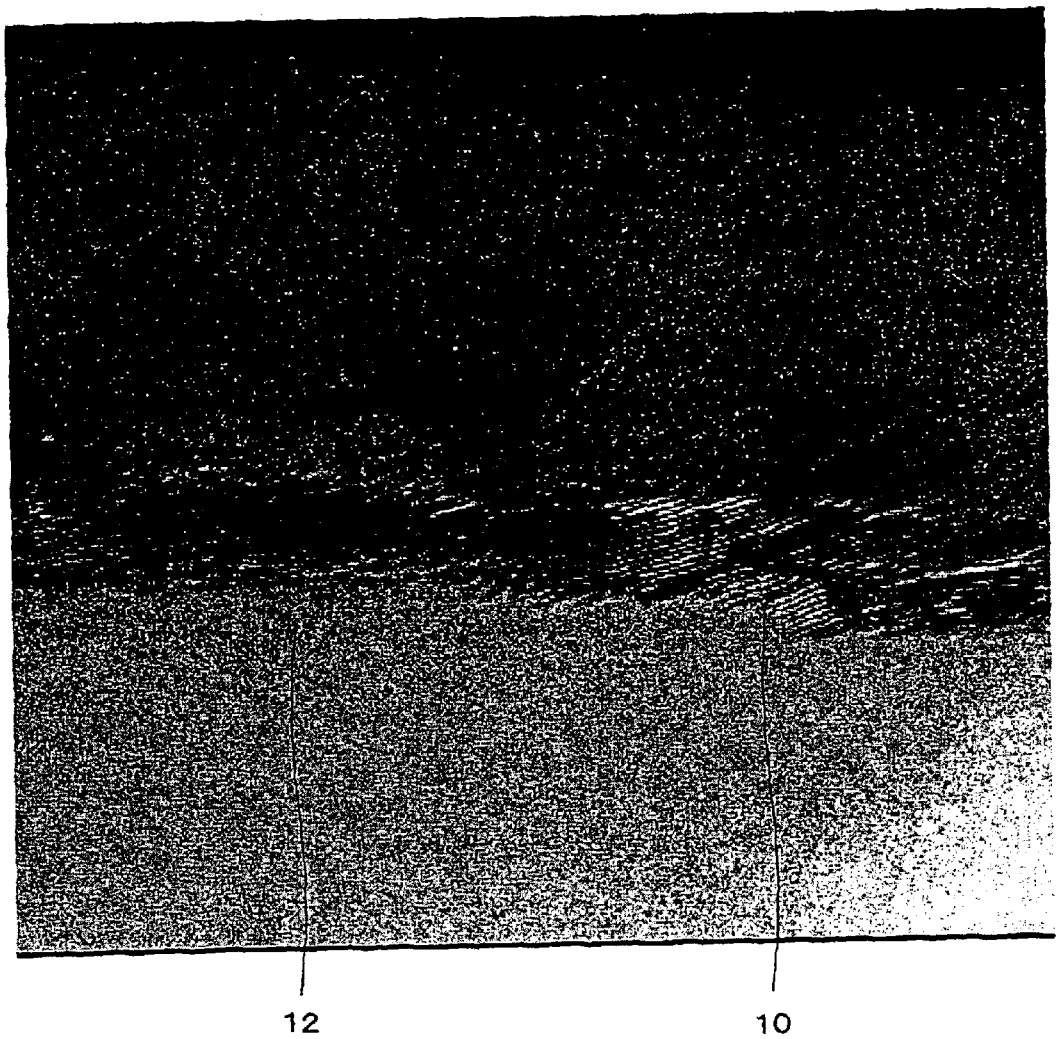
FIG. 5 is a copy of an enlarged micrograph of FIG. 4.

FIG. 4 is a copy of a transmission electron micrograph showing the carbon fiber having a herring-bone structure heated at a temperature of about 530° C. for one hour in air. FIG. 5 is a copy of an enlarged micrograph of FIG. 4, FIG. 6 is a copy of an enlarged micrograph of FIG. 5, and FIG. 7 is a schematic view of FIG. 6.

Figure 6:
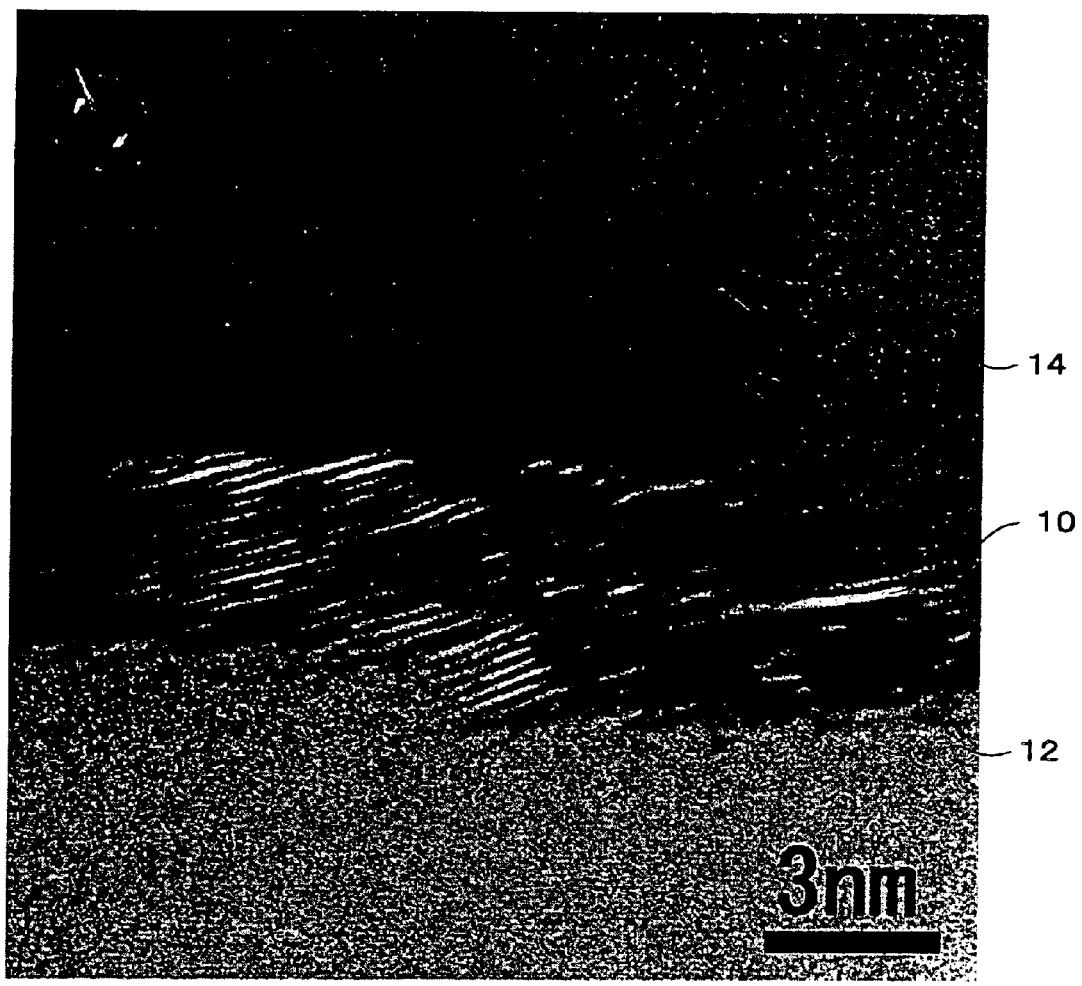
FIG. 6 is a copy of an enlarged micrograph of FIG. 5.
Figure 7:
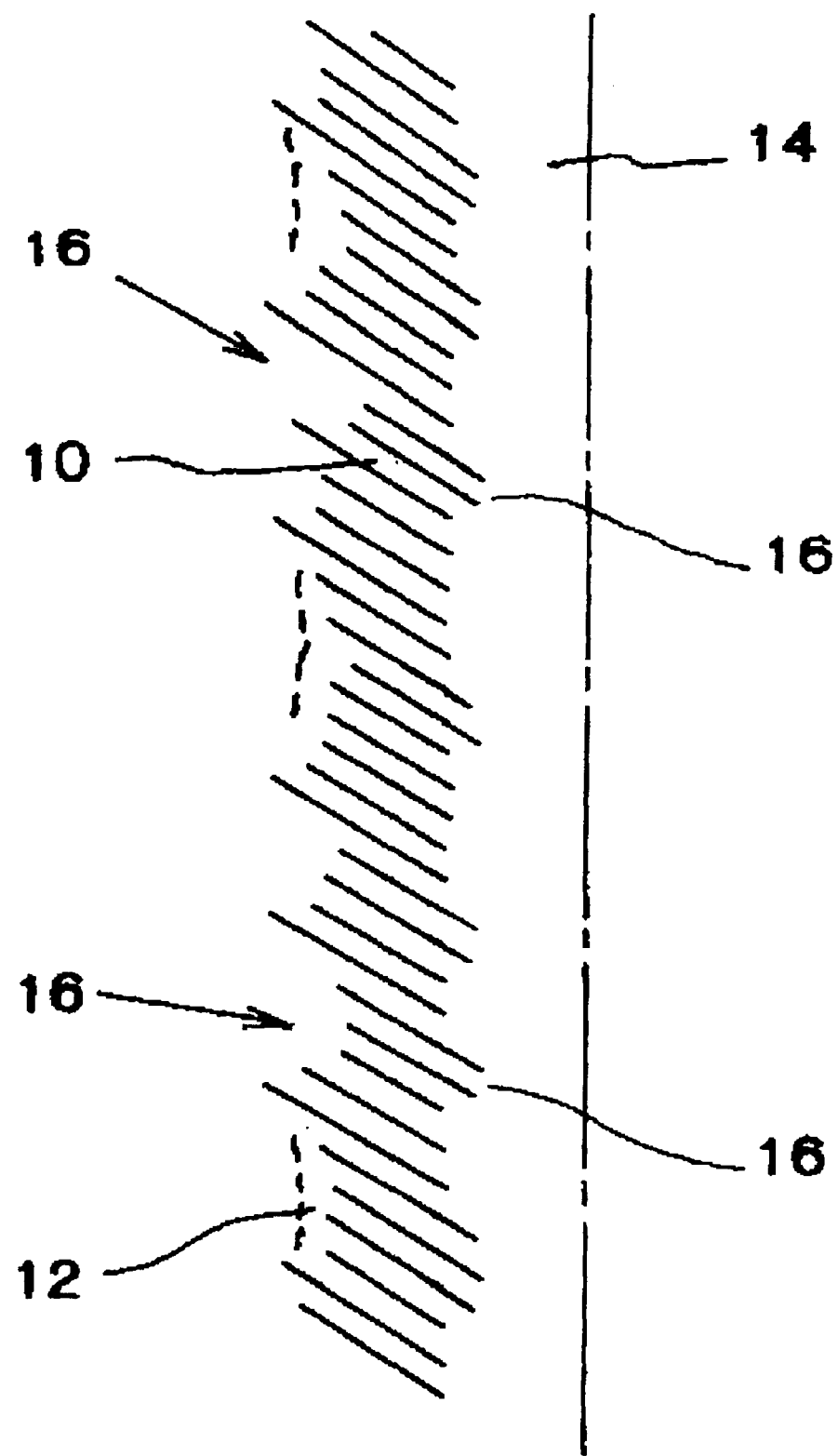
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 1 in which a number of hexagonal carbon layers 10 in the shape of a cup having no bottom are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group, to be increased on the exposed edges of the hexagonal carbon layers 10. These functional groups containing oxygen have high hydrophilicity and high affinity to various types of substances.

In addition, the hollow structure and the irregularities 16 contribute to anchoring effects to a large extent.

Figure 8:
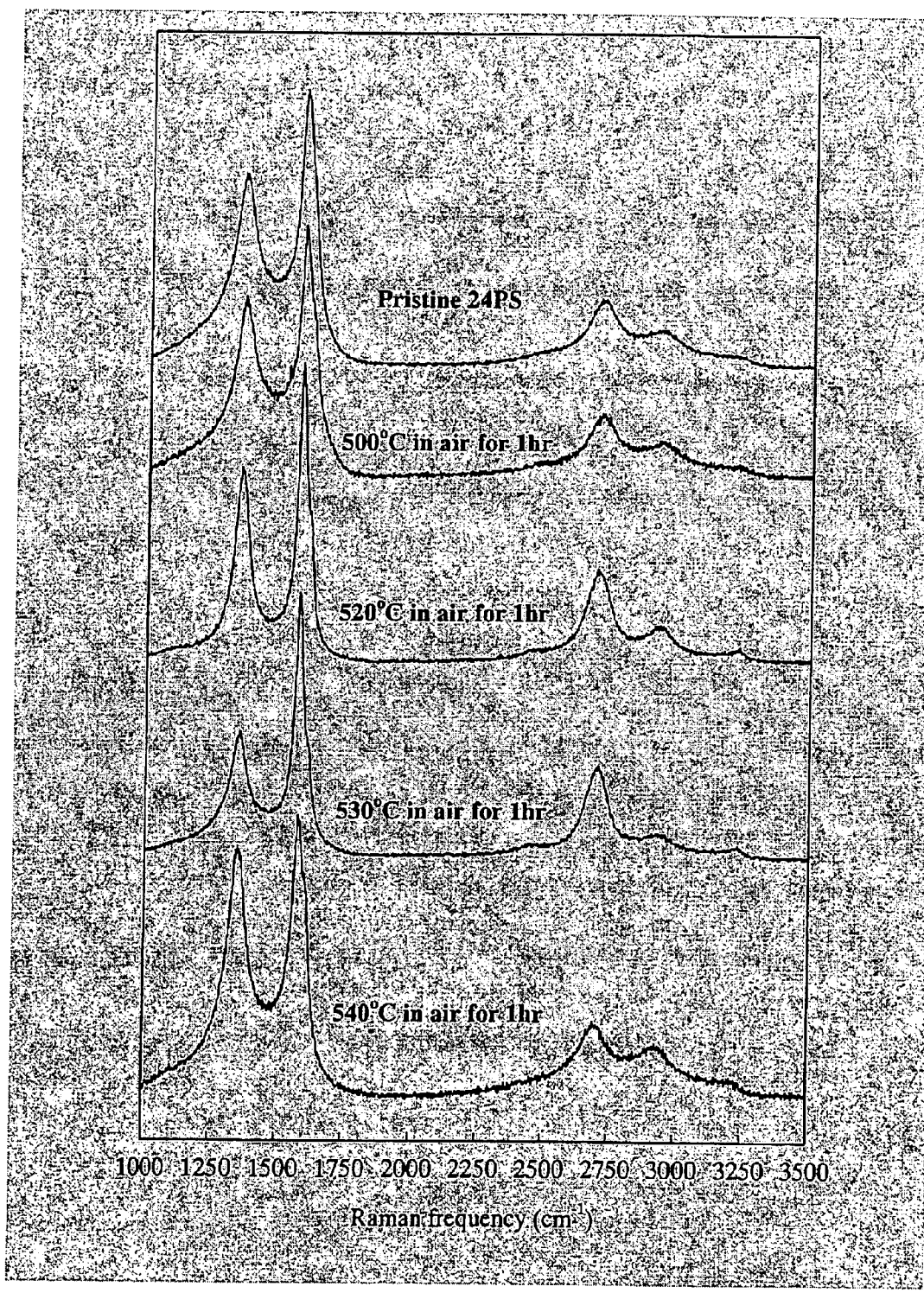
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of the D peak (1360 cm$^{-1}$) and the G peak (1580 cm$^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. This is one of the advantages. Specifically, atoms or the like are easily supported on the exposed edges of the hexagonal carbon layers having a high activity, since the substances are scarcely intercalated. Therefore, the carbon fiber functions as an efficient support.

Figure 9:
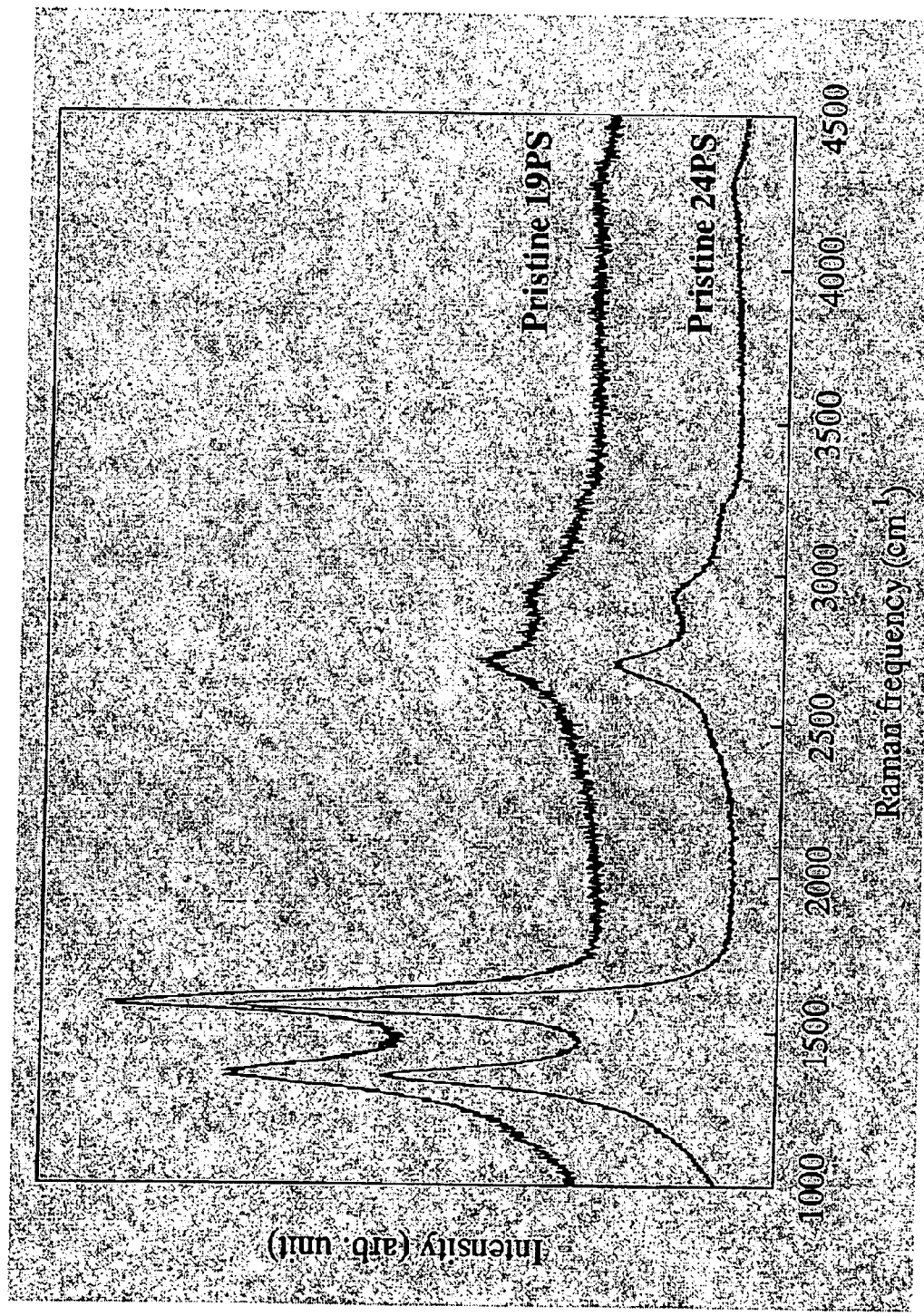
FIG. 9 is a characteristic chart showing the Raman spectra of carbon fiber samples No. 19PS and No. 24PS in which edges of hexagonal carbon layers are exposed by the above heat treatment.

FIG. 9 shows the Raman spectra of carbon fiber samples No. 19PS and No. 24PS in which the edges of the hexagonal carbon layers are exposed by the above heat treatment.

Figure 10:
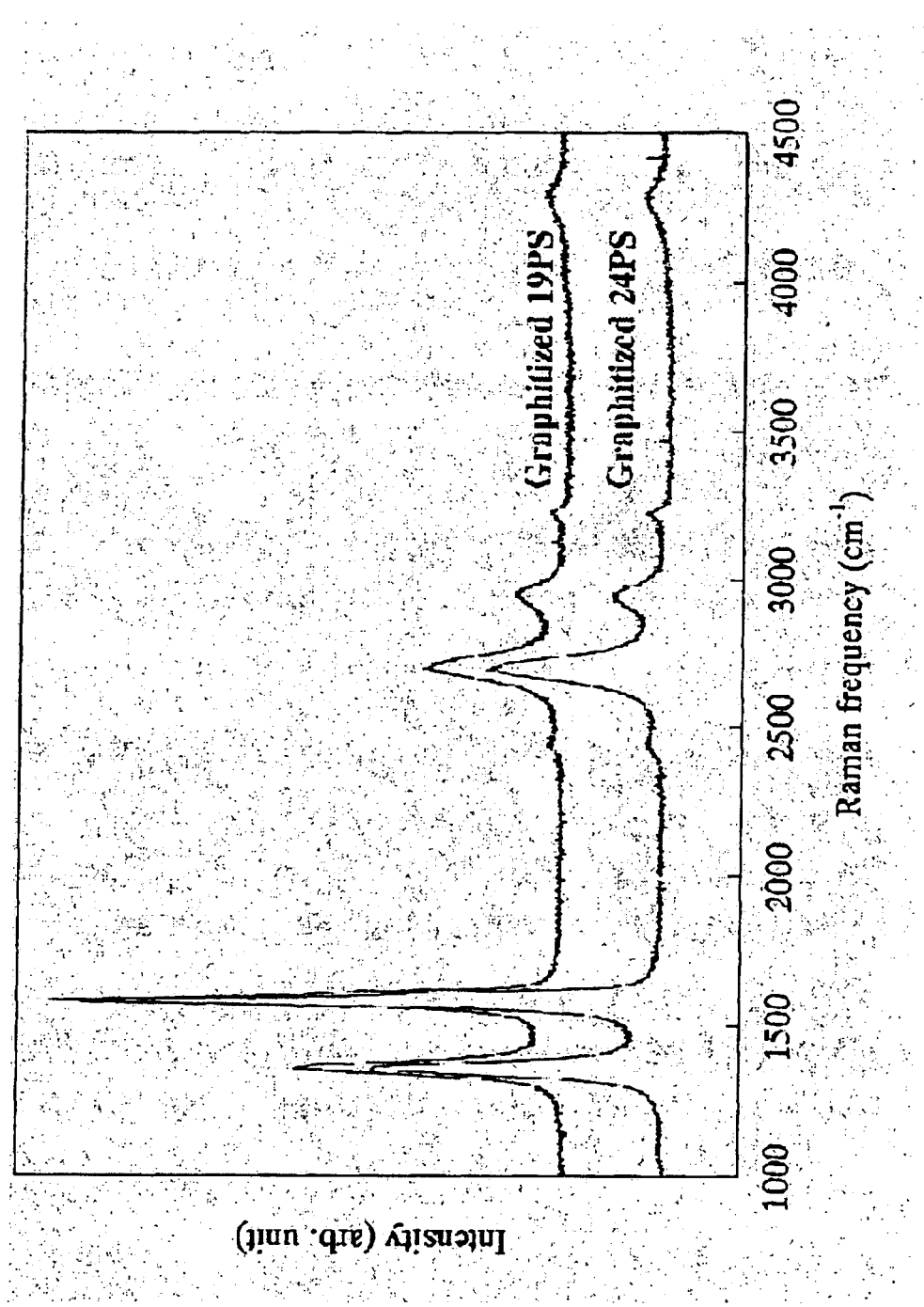
FIG. 10 is a characteristic chart showing the Raman spectra of the carbon fiber samples No. 19PS and No. 24PS, heated at 3000° C. after the edges of the hexagonal carbon layers has been exposed.

FIG. 10 shows the Raman spectra of the carbon fiber samples No. 19PS and No. 24PS, heated at 3000° C. (common graphitization treatment) after the edges of the hexagonal carbon layers has been exposed.

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The fact that the carbon fiber is not graphitized at a high temperature means that the carbon fiber is thermally stable.

The exposed edges of the hexagonal carbon layers 10 of the carbon fiber having the above properties easily bond to other atoms and have extremely high activity.

Fluorination of the carbon fiber in which the edges of the hexagonal carbon layer are exposed is described below.

Conditions used for fluorination were as follows.

Specifically, a nickel boat was charged with the above carbon fibers and placed in a nickel pipe for fluorination (inner diameter: 50 mmφ). The reaction temperature with fluorine was 340° C. The fluorine partial pressure and the nitrogen partial pressure were respectively 460 mmHg and 310 mmHg. The reaction time was 72 hours.

A catalyst such as silver fluoride may be used to promote fluorination.

The reaction products were obtained as pure white linear substances. This color shows that fluorinated carbon fibers having a structure shown by $C_xF_y$ were formed favorably.

The fluorination conditions are not limited to those described above.

Fluorination of a carbon fiber in which the hexagonal carbon layers are grown concentrically around the fiber axis is known.

However, in the case of fluorinating this carbon fiber, the hexagonal carbon layers are drawn by intercalated fluorine atoms toward the side from which the fluorine atoms are intercalated. As a result, the hexagonal carbon layers become zigzag in cross section and are destroyed. Therefore, the carbon fiber is powdered by fluorination, whereby the fibrous shape is lost. Therefore, advantages obtained from the fibrous shape are eliminated.

On the contrary, the carbon fiber having the herring-bone structure remains fibrous after fluorination. This is considered to be because the hexagonal carbon layers are tilted with respect to the fiber axis and have a turbostratic structure which is not graphitized.

As described above, since the fluorinated carbon fiber of the present embodiment remains fibrous after fluorination, the fluorinated carbon fiber can be suitably used as a cathode material of a lithium primary battery or additive to the cathode material due to high conductivity and excellent mechanical strength. The fluorinated carbon fiber can be used as an excellent active material for batteries, since a battery with a higher output than a case of using conventional covalent bond type carbon fluoride can be obtained.

Since the fluorinated carbon fiber of the present embodiment remains fibrous, the fluorinated carbon fiber maintains slippage between the AB planes. Therefore, the fluorinated carbon fiber has excellent lubricity when mixed with a base material such as resin, an epoxy resin for example, or oils and fats.

The fluorinated carbon fiber according to the present embodiment may be used for various types of applications such as water-repellent or oil-repellent agents, anti-tackiness agents, conductive agents, various types of composites, toner additives or carrier coating additives for electrostatic development, fuser rollers, phosphoric acid fuel cells, air-zinc batteries, and nickel-hydrogen batteries.

Since the fluorinated carbon fiber according to the present invention remains fibrous, the fluorinated carbon fiber has high conductivity and excellent mechanical strength.

Therefore, the fluorinated carbon fiber can be suitably used as the cathode material of the lithium primary battery or additive to the cathode material. The fluorinated carbon fiber can be used as an excellent active material for batteries, since a battery with a higher output than a case of using conventional covalent bond type carbon fluoride can be obtained.

Since the fluorinated carbon fiber according to the present invention remains fibrous, the fluorinated carbon fiber maintains slippage between the AB planes. Therefore, the fluorinated carbon fiber has excellent lubricity when mixed with a base material such as resin, an epoxy resin for example, or oils and fats.

What is claimed is:

1. A fluorinated carbon fiber comprising a coaxial stacking morphology of truncated conical tubular graphene layers,
    wherein each of the truncated conical tubular graphene layers includes a hexagonal carbon layer and has a large ring end at one end and a small ring end at the other end in an axial direction,
    wherein at least part of edges of the hexagonal carbon layers is exposed at the large ring ends, and
    wherein the exposed edges of the hexagonal carbon layers are fluorinated.

2. The fluorinated carbon fiber as defined in claim 1,
    wherein at least part of edges of the hexagonal carbon layers is exposed at the small ring ends.

3. The fluorinated carbon fiber as defined in claim 2,
    wherein the coaxial stacking morphology of the truncated conical tubular graphene layers is vapor grown,
    wherein at least part of the large and small ring ends is exposed by removing a deposited film formed during the vapor growth.

4. The fluorinated carbon fiber as defined in claim 1,
    wherein the coaxial stacking morphology of the truncated conical tubular graphene layers has a shape of a hollow core with no bridge.

5. The fluorinated carbon fiber as defined in claim 1,
    wherein an outer surface of the fluorinated carbon fiber is formed of the large ring ends stacked in the axial direction, and
    wherein exposed part of the edges of the hexagonal carbon layers has an area equal to or more than 2 percentages of an area of the outer surface.

6. The fluorinated carbon fiber as defined in claim 1,
    wherein an inner surface of the fluorinated carbon fiber is formed of the small ring ends stacked in the axial direction, and
    wherein the edges of the hexagonal carbon layers are exposed on the inner surface.

7. An active material for battery comprising the fluorinated carbon fiber as defined in claim 1.

8. A solid lubricant comprising the fluorinated carbon fiber as defined in claim 1.

* * * * *